(No Model.)
H. F. C. PEARSON.
METHOD OF AND APPARATUS FOR MAKING ARTICLES OF MOLDED RUBBER.
No. 271,911. Patented Feb. 6, 1883.
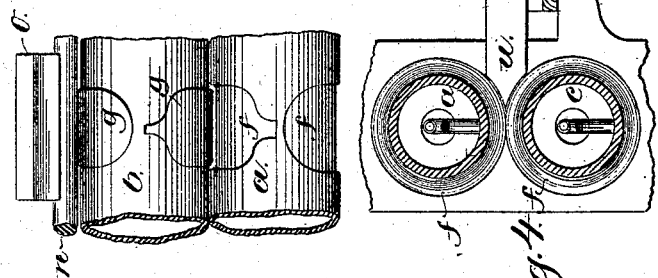
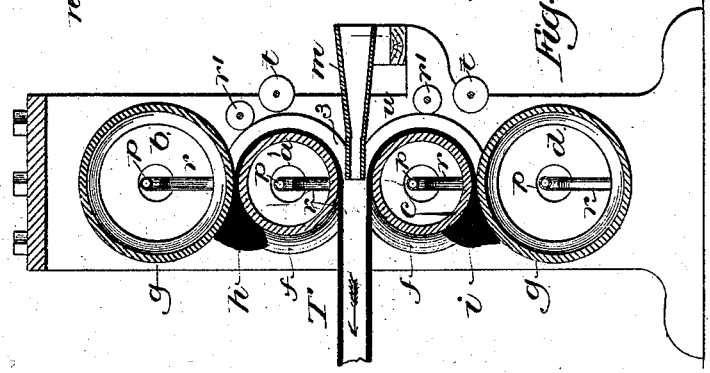
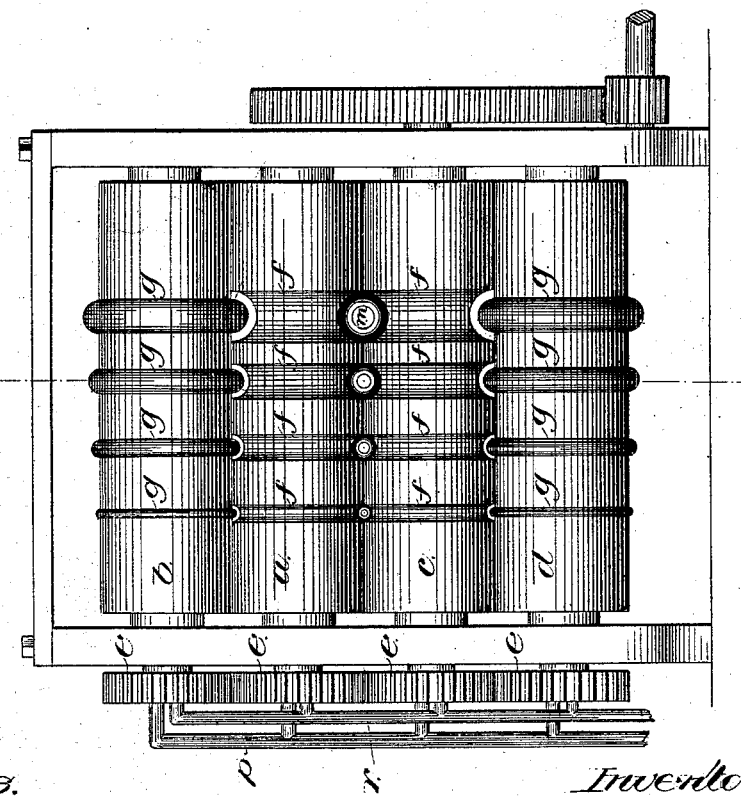
Witnesses.
John F. C. Prindert
Fred A. Powell
Inventor:
Henry F. C. Pearson.
by Crosby & Gregory attys.

UNITED STATES PATENT OFFICE.

HENRY F. C. PEARSON, OF ANDOVER, MASSACHUSETTS, ASSIGNOR OF ONE-HALF TO GEORGE RIPLEY, OF SAME PLACE.

METHOD OF AND APPARATUS FOR MAKING ARTICLES OF MOLDED RUBBER.

SPECIFICATION forming part of Letters Patent No. 271,911, dated February 6, 1883.

Application filed August 15, 1882. (No model.)

*To all whom it may concern:*

Be it known that I, HENRY F. C. PEARSON, of Andover, county of Essex, State of Massachusetts, have invented an Improvement in Method of and Apparatus for Making Articles of Molded Rubber, of which the following description, in connection with the accompanying drawings, is a specification.

My invention, relating to the art of making rubber articles, is embodied in an apparatus especially adapted for making rubber tubing, or bags, bottles, and other hollow articles of rubber, such as have heretofore been made by shaping two or more pieces of rubber in suitable dies, uniting them together, and subsequently vulcanizing them.

In making rubber tubes as heretofore commonly practiced a sheet of rubber has been rolled around and around a core consisting of a metallic rod, upon which it is vulcanized, and the said core subsequently withdrawn. This process involves a large amount of manual labor, thus making the tubing very expensive.

In my invention I employ two pairs of rolls, each pair consisting of what may be termed a "matrix" and "die" roller, by which the plastic rubber in passing between them is molded to the shape desired for one portion of the completed article—in the case of tubing the channel-shaped portion, which will be formed by dividing the tube longitudinally. The matrix-rollers of each pair are also properly arranged to co-operate with one another, so that the two portions of the completed article which are shaped in the roller of each pair are in the further movement of the rollers brought together and united to form the complete article, which is then ready to be vulcanized.

When the machine is employed for making tubing a core or mandrel may be imposed between the matrix rollers at the point where the two portions unite, the core being employed where short lengths of tubing are to be produced, and serving as a support for the tubing while being vulcanized in the usual manner. In case the tubing is to be made in a continuous length a hollow mandrel will preferably be employed, through which suitable material—such as pulverized French chalk—may be introduced to the interior of the tubing to prevent it from collapsing and having its inner walls adhere together.

In case such articles as hollow bags or bottles are to be produced, a suitable device will be employed for covering the inner surface of one or both portions of the bag with separating material, to prevent them from uniting in the subsequent process of vulcanizing except where desired.

Figure 1 is a front elevation of an apparatus employed in producing tubing in accordance with this invention; Fig. 2, a transverse vertical section thereof; Fig. 3, a modification showing rollers such as are adapted for making hollow bags or bottles, and Fig. 4 a detail to be referred to.

The apparatus consists essentially of two pairs of rollers, $a\,b$ and $c\,d$, connected by suitable gearing, $e$, to rotate at the proper relative speed, the said matrix-rollers $a$ and $c$ being provided with depressions $f$, forming matrices or molds, which, in co-operation with the projecting portions $g$ of the die-rollers $b\,d$, form the rubber material $h\,i$. (see Fig. 2,) fed in between the pairs of rollers into the shape of the space between the recesses $s$ and projections $g$ of the said matrix and die-rollers at the points where they most nearly approach one another.

In the form of rollers illustrated in Figs. 1 and 2 the rubber is thus molded in each pair to a channel or semi-tubular shape, and in any case the portions formed in the two matrix-rollers $a\,c$ will be brought together between the said rollers, and will unite or adhere together to form a single article or tube, as shown at T, Fig. 2; and in making tubing a suitable supporting-core may be introduced at 3 between the two portions of the article when brought together by the matrix-rollers $a\,c$, the said core being fed along with the tubing as it issues from between the rollers, and serving to prevent it from collapsing before and during the process of vulcanizing.

In case it is desired to form continuous tubing, a suitable mandrel, $m$, may be introduced to support the two portions of tubing where brought together by the rollers $a\,c$, the said mandrel preferably being hollow to admit of suitable pulverized or plastic material being blown or forced into the tubing to prevent it from collapsing or preventing its inner surfaces from adhering in case it should partially collapse.

The pair of rollers shown in Fig. 3 have their recesses and projecting portions so shaped that the space between their surfaces as they travel over one another is that of half of a bag or bottle, having a slight flange about its edge to be united with a similar flange upon the other half or portion of the bottle when the said two portions were brought together between the matrix-roller $a$ and the corresponding matrix-roller, $c$. (Not shown in Fig. 3.)

In order to prevent the two portions from adhering except at the edges or other desired points, the inner surface of one of the portions may be provided with suitable material for separating or preventing the adhesion by means of a device shown in Fig. 3, as a roller, $n$, placed beneath a hopper or receptacle, $o$, containing suitable separating material—such as pulverized French chalk—which is transmitted from the surface of the said roller to the raised portion $g$ of the die-roller $b$, and thence to the depressed portion of the interior of the bag formed by the said die.

The rollers shown in Fig. 1 are adapted to make several different sizes of tubing simultaneously, and they are made hollow, and provided with pipes $p\,r$ for introducing steam and conveying away water of condensation to keep the rollers at the proper temperature for operating with rubber.

It is obvious that the two portions formed in the two rollers need not be of the same shape, although the outline at the point where the surface of the two die-rollers $b\,d$ meet will usually be the same in both portions.

It will be understood that articles of any shape, either hollow or solid, that are made in two or more portions united on a common plane, may be made in accordance with this invention; but it is especially advantageous for the production of hollow articles and tubing, as hereinbefore described.

The particular arrangement of the rolls shown is not essential, as it is obvious that they may be placed otherwise in relation to one another, it being essential only that the two matrix-rollers $a\,c$ shall be properly located and driven with the proper speed to bring the independently-molded portions together, the said portions uniting while being removed from the molds.

For making tubing the matrix-rollers $a\,c$ may be provided with trimming-wheels or cutters $r'$ (see Fig. 2) at the edges of the depressions $f$, to remove the material which passes through between the plain part of the rolls, and the pieces thus trimmed off are wound upon suitable reels, $t$.

Adjustable guides or supports, $u$, may be employed to sustain the walls of the tubing where joined together by the matrix-rolls $a\,c$, the said supports being fitted between the rolls at the side of their depressions $f$, as shown in Fig. 4, which is a section similar to Fig. 2, but with the mandrel $m$ removed to show the said support.

I claim—

1. The combination of two pairs of molding-rolls, the recessed or matrix rolls of each pair co-operating together to unite the independently molded portions into a single article, substantially as described.

2. The two pairs of molding-rolls, each pair arranged to make one portion of the completed article, and the matrix-rolls of the two pairs co-operating together to unite the said portion, combined with a mandrel supporting the said portions near their point of union, substantially as described.

3. In an apparatus for molding hollow articles of rubber, the combination of die and matrix rolls, arranged in pairs, each pair molding one portion of the complete article, and the different matrix-rolls co-operating to unite the said portions thus separately molded, combined with mechanism, substantially as described, for providing the interior surface of the said molded article with separating material, as and for the purpose set forth.

4. In an apparatus for making rubber tubing, the two pairs of molding-rolls, each forming one portion of the said tubing, combined with the hollow mandrel, whereby the said portions are supported near their point of union and separating material inserted in the interior of the complete tubing, substantially as described.

5. The herein-described process of producing molded articles of rubber, which consists in shaping different portions of the complete article in independent moving molds and bringing the said portions together while in the molds, and uniting them in removing them from the molds, substantially as described.

In testimony whereof I have signed my name to this specification in the presence of two subscribing witnesses.

HENRY F. C. PEARSON.

Witnesses:
JOS. P. LIVERMORE,
W. H. SIGSTON.